United States Patent [19]
Kinoshita et al.

[11] Patent Number: 5,922,830
[45] Date of Patent: Jul. 13, 1999

[54] HIGHLY HYGROSCOPIC POLYAMIDE FIBER, AND PRODUCTION AND APPLICATION THEREOF

[75] Inventors: Naoyuki Kinoshita, Nagoya; Tetsuya Katoh, Aichi-gun; Yumiko Sawai, Nishikasugai-gun, all of Japan

[73] Assignee: Toray Industries, Inc., Japan

[21] Appl. No.: 08/823,478

[22] Filed: Mar. 25, 1997

[30] Foreign Application Priority Data

Mar. 29, 1996 [JP] Japan .................................... 8-075523

[51] Int. Cl.$^6$ .......................... C08G 69/08; C08G 73/10; B32B 27/34
[52] U.S. Cl. .......................... 528/310; 528/170; 528/322; 528/332; 528/335; 528/336; 428/395; 428/396
[58] Field of Search ..................... 428/395, 396; 528/310, 322, 170, 332, 335, 336

[56] References Cited

U.S. PATENT DOCUMENTS 5,683,584  11/1997  Wenthold et al. ........................ 264/41

FOREIGN PATENT DOCUMENTS

| | | |
|---|---|---|
| 51-035 721 | 3/1976 | Japan . |
| 51-067 419 | 6/1976 | Japan . |
| 54-059 422 | 5/1979 | Japan . |
| HO7-150414 | 6/1995 | Japan . |
| HO7-150415 | 6/1995 | Japan . |

OTHER PUBLICATIONS

Derwent Abstract: C 95–112237.
Derwent Abstract: C 95–112236.
JAP10 J07150415 Jun. 13, 1995.
JAP10 J07150414 Jun. 13, 1995.

*Primary Examiner*—P. Hampton-Hightower
*Attorney, Agent, or Firm*—Austin R. Miller

[57] ABSTRACT

A highly hygroscopic polyamide fiber formed from a polyamide compound containing a polyvinylpyrrolidone (in an amount of 3–15 wt %) which is synthesized in isopropyl alcohol as a solvent, contains pyrrolidone in an amount less than 0.1 wt %, and has a K-value of 20–70. This fiber contains pyrrolidone in an amount less than 0.1 wt % of the amount of polyvinylpyrrolidone. This fiber is characterized by a yellowness index lower than 10 before dyeing, a large difference between the maximum moisture absorptivity and the standard moisture absorptivity, and a low content of water-soluble components that are subject to leaching.

9 Claims, No Drawings

HIGHLY HYGROSCOPIC POLYAMIDE FIBER, AND PRODUCTION AND APPLICATION THEREOF

BACKGROUND OF THE INVENTION

The present invention relates to a highly hygroscopic polyamide fiber suitable for use as a raw material in comfortable garments including innerwear and leg wear.

Polyamide fiber, one of synthetic fibers, is characterized by high strength, good wear resistance, soft hand, luster, and dyeability in bright colors. Therefore, it has found use particularly for garments such as panty hose (leg wear), innerwear, and sports wear. Typical examples of innerwear include lingerie and foundation garments which are characterized by drapability, smooth surface touch, and cool feeling which are characteristic of polyamide fiber. Panty hose of polyamide fiber is favored for its high strength, good wear properties, and soft hand.

By contrast, natural fiber represented by cotton and wool is characterized by its good hand and clothing comfort. Cotton is most commonly used for innerwear and underwear (in direct contact with the skin) because of its adequate moisture absorptivity. Unfortunately, cotton innerwear lacks drapability and luster and hence looks poor. In addition, it is not comparable to polyamide innerwear in surface smooth touch and cool feeling. Therefore, cotton is not suitable especially for women's innerwear.

On the other hand, thermoplastic synthetic fiber such as polyamide fiber and polyester fiber is inferior in moisture absorptivity to natural fiber despite its high strength and good color fastness. Therefore, it does not completely absorb moisture due to perspiration inside the garment. Moisture remaining unabsorbed inside the garment causes discomfort at high temperature and high humidity in summer. When it comes to clothing comfort, polyamide fiber is not yet satisfactory although it is higher than polyester fiber in equilibrium moisture regain (moisture absorptivity in the standard state).

The present inventors previously proposed a new technology of improving the moisture absorptivity of polyamide fiber by incorporating polyamide with polyvinylpyrrolidone (PVP for short hereinafter) and polyether amide (PEA for short hereinafter). (Japanese Patent Laid-open No. 150414/1995) The resulting polyamide fiber has improved moisture absorptivity as intended but is poor in color (and hence is not suitable for garments which need a good appearance). In addition, it is liable to frequent breakage during spinning in the case of extremely fine filaments or odd-shaped filaments designed for good hand.

The present inventors also proposed a new technology for producing hygroscopic polyamide fiber with good whiteness by incorporating polyamide with PVP and a reducing agent. (Japanese Patent Laid-open No. 150415/1995) This technology yields fiber which looks almost white but still has a yellowish color attributable to PVP and hence is unsatisfactory in yellowness unless dyed. In addition, this fiber is liable to frequent breakage during spinning in the case of extremely fine filaments or odd-shaped filaments.

SUMMARY OF THE INVENTION

It is an object of the present invention to provide a highly hygroscopic polyamide fiber having a good color tone. It is another object of the present invention to provide a process for efficiently producing a highly hygroscopic fiber superior in spinnability for stable production.

The highly hygroscopic polyamide fiber according to the present invention is formed from a polyamide containing polyvinylpyrrolidone in an amount of 3–15 wt % of the polyamide, with the content of pyrrolidone in the polyamide being less than 0.1 wt % of the content of the polyvinylpyrrolidone.

The process for producing a highly hygroscopic polyamide fiber comprises incorporating a polyamide with a polyvinylpyrrolidone containing pyrrolidone in an amount less than 0.1 wt % and having a K-value of 20–70 in an oxygen-poor environment, thereby preparing a high-concentration master batch containing polyvinylpyrrolidone in an amount of 10–50 wt %, mixing a polyamide with said master batch by chip blending so that the resulting mixture contains a prescribed amount of polyvinylpyrrolidone, and making the mixture into yarn by melt spinning.

Yarn making by melt spinning should preferably be made by pulling at a rate greater than 1000 m/min and subsequent drawing (without winding before drawing) or by pulling at a rate greater than 3000 m/min, with drawing substantially omitted.

The highly hygroscopic polyamide fiber according to the present invention should preferably be used in the form of filament yarn for stockings and innerwear.

According to the present invention, it is important to use a specific polyvinylpyrrolidone (PVP) different from the conventional one and to limit the content of pyrrolidone in the polyamide fiber to a much lower level than that in the conventional technology. In this way it is possible to produce extremely fine yarns and odd-shaped yarns in a stable manner which have the advantage of conventional polyamide fiber and yet exhibit a good color tone (with low yellowness), good moisture absorptivity, good dyeability, and good wash fastness.

According to the present invention, the specific PVP is characterized by containing pyrrolidone in a very small amount less than 0.1 wt %. It can be obtained by the synthesis which employs isopropyl alcohol as a solvent for polymerization.

By contrast, the conventional PVP contains pyrrolidone in an amount of 0.13–0.30 wt %, because its polymerization step employs water as a solvent and yields much pyrrolidone as a by-product. In the case where a polyamide is incorporated with PVP containing a large amount of pyrrolidone, the resulting polyamide fiber contains a large amount of pyrrolidone as a matter of course and hence has a high yellowness index. In fact, it is difficult to decrease the yellowness index below 10. For this reason, the conventional PVP-containing fiber has a high yellowness index and takes on a dull color tone after dyeing, and hence it is not suitable for garments which need a good appearance.

DESCRIPTION OF THE PREFERRED EMBODIMENTS

According to the present invention, the highly hygroscopic polyamide fiber should contain polyvinylpyrrolidone (PVP) in an amount of 3–15 wt % of the polyamide so as to achieve the desired moisture absorptivity. Since the present invention employs PVP containing a very small amount of pyrrolidone, the resulting hygroscopic polyamide fiber also contains a very small amount of pyrrolidone less than 0.1 wt % of the amount of PVP.

According to the present invention, the content of PVP in polyamide should be 3–15 wt %, preferably 4–8 wt %, so that the resulting polyamide fiber has the desired moisture absorptivity. With a content of PVP less than 3 wt %, the resulting polyamide fiber does not have sufficient moisture absorptivity. With a content of PVP in excess of 15 wt %, the resulting polyamide fiber feels sticky and is poor in productivity.

According to the present invention, the content of pyrrolidone based on PVP should be less than 0.1 wt %, preferably less than 0.05 wt %, and more preferably less than 0.03 wt %. Only when the content of pyrrolidone is as specified above, the resulting polyamide fiber has a yellowness index lower than 10 (before dyeing) and hence is suitable for garments. With a yellowness index lower than 10, the polyamide fiber and its fabric can be dyed in a bright color for luxurious appearance.

The PVP containing pyrrolidone in an amount less than 0.1 wt % as specified in the present invention can be produced by polymerization in isopropyl alcohol as a solvent. It is desirable to use an initiator which does not contain a hydrogen peroxide catalyst, so as to suppress the occurrence of pyrrolidone as a by-product which causes yellowing. Except for this restriction, the polymerization can be carried out in the usual way.

The PVP used in the present invention should have a K-value in the range of 20–70, preferably 20–60. PVP with an excessively low K-value easily leaches out of strands during water cooling after incorporation into polyamide. This is due to insufficient entanglement of PVP with polyamide molecular chains. To compensate for loss by leaching, it is necessary to incorporate a large amount of PVP into polyamide. This reduces productivity. PVP with an excessively high K-value increases the melt viscosity during its mixing with polyamide. This increased viscosity presents difficulties in melt extrusion and subsequent pelletizing. This also reduces productivity.

According to the present invention, the polyamide fiber is characterized in that the content of the water-soluble components that leach out is less than 5%, preferably less than 3%. This value is obtained from the change in weight that occurs when the polyamide fiber of the present invention is treated with boiling water for 30 minutes.

PVP is extremely soluble in water and hence it tends to bleed out from the polymer surface after incorporation into a polymer. In addition, pyrrolidone (as a by-product) is also highly water-soluble and hence tends to bleed out from the polymer surface. For this reason, preventing PVP and pyrrolidone from leaching out of the highly hygroscopic polyamide fiber containing PVP is important for the polyamide fiber to keep its hygroscopic properties and good hand. With a leachable content less than 5%, the polyamide fiber has a good hand and smooth touch owing to the substantial absence of PVP on the fiber surface after fabrication into textile products.

In order to reduce the leachable content as desired, it is necessary to take measures to strengthen the entanglement of PVP with polyamide molecular chains. This object is achieved by, for example, incorporating PVP into polyamide by extrusion, thereby giving a master batch. The process of incorporation should be carried out in an oxygen-poor environment, so that the resulting polyamide compound is less liable to fiber breakage during spinning. If the process of incorporation is carried out in an atmospheric or oxygen-rich environment (containing 20% or more oxygen), the resulting polyamide compound is liable to frequent fiber breakage during spinning. The oxygen content should be lower than 15%, preferably lower than 10%. This object is achieved by supplying an inert gas (such as nitrogen) to the hopper and cylinder.

According to the present invention, the amount of PVP to be incorporated into the master batch should be 10–50 wt %. With an amount less than 10 wt %, the master batch does not produce the intended effect. Incorporating more than 50 wt % involves difficulties.

The thus obtained PVP-containing polyamide master batch (in the form of pellets) is mixed with virgin polyamide (in the form of pellets) in a prescribed ratio. (This process is referred to as chip blending.) The resulting mixture is subjected to melt spinning. Incidentally, in the case where the polyamide is used in combination with polyether amide (PEA) or polyether ester amide (PEEA), as mentioned in Japanese Patent Laid-open No. 150414/1995, it is possible to add PVP and PEA and/or PEEA to the aqueous solution of caprolactam prior to polymerization into polyamide. Unless PEA and PEEA are used, the above-mentioned master-batching is effective.

The PVP-containing polyamide undergoes melt-spinning in the usual way. The emergent filaments may be pulled (after cooling and oiling) at a rate greater than 1000 m/min and then drawn without winding. (Direct spinning-drawing method) Alternatively, the emergent filaments may be pulled at a high rate greater than 3000 m/min and then taken up without substantial drawing. (High-speed spinning method)

The two-stage spinning method, in which the emergent filaments are wound up once and then drawn, suffers the disadvantage that the package of undrawn filaments readily deforms due to rapid moisture absorption, thereby hampering stable spinning.

The above-mentioned spinning yields highly hygroscopic polyamide fiber in the form of multifilament yarn. The single yarn may have a round cross section or an odd-shaped cross section such as trilobal and tetralobal. Yarns with an odd-shaped cross section can be spun stably by the process of the present invention. There are no specific restriction on the fineness of yarns. Multifilament yarns suitable for garments should have a single yarn fineness of 0.5–8.0 denier.

The thus obtained highly hygroscopic multifilament yarn can be woven or knitted into a fabric in the usual way applicable to ordinary polyamide fiber. The fabric may be sewn to produce a variety of garments. It is suitable particularly for inner wear (such as lingerie and foundation garments) and stockings which come into direct contact with the skin, and also for sports wear (such as wind breaker, tennis wear, ski wear, and training wear) which is exposed to sweat. It will also find use in non-garment applications where high moisture absorptivity is required.

To meet requirements for moisture absorption, it is necessary that the highly hygroscopic polyamide fiber have a maximum moisture absorptivity greater than 8%, which differs by more than 4% from the standard moisture absorptivity after moisture release. With a maximum moisture absorptivity lower than 8%, the polyamide fiber does not absorb sweat (insensible perspiration) sufficiently and consequently it is poor in clothing comfort. With a difference smaller than 4% between the maximum moisture absorptivity and the standard absorptivity after moisture release, the polyamide fiber is poor in clothing comfort because it does not readily permit absorbed sweat to evaporate again.

According to the present invention, the highly hygroscopic polyamide fiber should dry at a rate greater than 0.014 cc/min so that it is not sticky to the touch due to perspiration. This object is achieved by properly controlling the PVP content which is subject to leaching.

According to the present invention, the highly hygroscopic polyamide fiber should be in the form of filament yarn that meets the following requirements if it is to be used for stockings.

Elongation: 35–50% Relation among elongation (A %), Young's modulus (B g/d), and the number of filaments (C): $0.25 \leq A/(B \times C) \leq 0.40$ If the value of A/(B×C) is smaller than 0.25, the resulting stockings lack soft hand because the polyamide fiber has a relatively high initial tensile stress (Young's modulus). If it is greater than 0.40, the resulting stockings are poor in appearance because the polyamide fiber has a relatively low initial tensile stress (Young's modulus and hence is less stiff). This is true in the case of alternately knitted stockings; less stiff yarns are subject to stitch distortion With an elongation greater than 50%, the polyamide fiber is poor in wash fastness.

In the case of conventional polyamide fiber free of PVP has a relatively high Young's modulus and hence does not meet the above-mentioned requirements. By contrast, the highly hygroscopic polyamide fiber of the present invention readily meets them and contributes to high-quality stockings.

Stockings include panty hose, long stockings, short stockings, and tights.

The highly hygroscopic polyamide fiber of the present invention may be used as knitting yarn for at least any of the toe part, leg part, and panty part of panty hose. It should desirably account for more than 30 wt % of all the knitting yarn. The higher the ratio, the better the clothing comfort. It is suitable particularly for the panty part and leg part.

The knitting yarn for stockings may be in the form of covered elastic yarn (composed of an elastic yarn and covering polyamide filaments) or in the form of crimped or uncrimped filament yarn.

The covered elastic yarn is used for stockings of support type. It falls into two main groups: single-covered elastic yarn (SCY) and double-covered elastic yarn (DCY). The former consists of an elastic yarn (as a core) and a polyamide filament yarn wound around it in a single layer. The latter consists of an elastic yarn (as a core) and a polyamide filament yarn wound around it in double layers, with the upper and lower layers in opposite directions.

The elastic yarn (as a core) is usually one which is formed from polyurethane, polyamide elastomer, polyester elastomer, natural rubber, synthetic rubber, butadiene, and or like. The one formed from polyurethane or polyamide elastomer is suitable for stockings because of its elasticity, thermal properties, and durability.

Stockings of support type are usually produced from covered elastic yarn alone by knitting or from covered elastic yarn and nylon yarn by alternate knitting, by using a knitting machine with two or four feeders.

In the case where the highly hygroscopic polyamide fiber of the present invention is used for inner wear, it is desirable that the fiber have an odd-shaped cross section such as trilobal and multilobal, with a degree of deformation greater than 2.4. Such an odd-shaped cross section helps form capillaries between filaments, and the resulting capillarity contributes to moisture absorptivity and drying (due to rapid diffusion). In addition, the high degree of deformation leads to a large sectional area of fiber, which in turn contributes to moisture absorption.

The degree of deformation of fiber is defined as the ratio of the maximum distance to the minimum distance, with the distance being measured from the center of gravity of the cross section to the peripheral edge of the cross section.

In the case where the highly hygroscopic polyamide fiber of the present invention is used in the form of fabric for inner wear, the fabric should have a water-absorption height greater than 70 mm, so that it does not feel sticky when it absorbs a large amount of sweat.

For garments (such as stockings and inner wear) to exhibit the desirable water absorptivity, it is necessary that the highly hygroscopic polyamide fiber of the present invention account for more than 30 wt % of the total fiber materials. The higher the ratio, the better the clothing comfort.

Since the highly hygroscopic polyamide fiber of the present invention has a drying rate greater than 0.014 cc/min, the fabric made from it does not feel sticky and has good clothing comfort.

Physical properties in the present invention are measured by the following methods.

Pyrrolidone content (based on PVP)

A fiber sample (100 mg) is dissolved in a mixed solvent of hexafluoroisopropanol (3 ml) and chloroform (1 ml). The resulting solution is given ethanol for reprecipitation of polymer components. The solution is diluted to 20 ml. The diluted solution is analyzed by gas chromatography in the usual way. The apparatus is GC14A (from Shimadzu Corporation) and the column is NB-1 (15 m long). The amount of pyrrolidone is determined from a previously prepared calibration curve for valerolactam. The content of pyrrolidone in fiber is calculated from the equation below. Content of pyrrolidone (wt % of fiber)=[(GC peak area/ calibration curve coefficient) (mg/ml)×amount of solution (ml)/amount of sample (mg)]×100

The content of pyrrolidone (wt %) in PVP is calculated from the equation below.
[content of pyrrolidone (wt % of fiber)/content of PVP (wt % of fiber)] x 100

K-value of PVP

A sample of PVP is dissolved in water to give a 1% solution and the solution is measured for relative viscosity. The K-value is calculated from Fikentscher's equation below.

$$\log Z = C[75\ k^2/(1+1.5\ k\ C)+k]$$

where Z: relative viscosity of aqueous solution with a concentration C k: K-value x 10–3

C: concentration of aqueous solution (w/v %)

Content of leachable water-soluble components

A sample of polyamide fiber is dried at 110° C. for 8 hours, and the weight ($W_1$) of the dry sample is measured. The sample is immersed in boiling water for 30 minutes and then dried again at 110° C. for 8 hours. The weight ($W_2$) of the dry sample is measured. The weight loss calculated from $(W_1-W_2)/W_1$ is regarded as the content of leachable water-soluble components.

Yellowness index of fiber or fabric

A sample fiber is knitted into a tubular fabric (with a density of 45/inch) by using a 27-gauge tubular knitting machine. A sample of knitted fabric or woven fabric (folded over) is measured for tristimulus values (X, Y, Z) by using a color meter Σ80 from Nippon Denshoku Kogyo Co., Ltd. The yellowness index (YI) is calculated from the equation below.

$$YI = 100 \times [1.28X - 1.06Z]/Y$$

The maximum moisture absorptivity and the standard absorptivity after moisture release of fiber and fabric A sample of fiber as such (or in the form of tubular knitting fabric) or a sample of fabric is scoured to remove the finishing agent. The scoured sample (about 1 g placed in a weighing bottle with a tare weight of F g) is dried at 110° C. for 2 hours in a drier. The weighing bottle, with its mouth tightly sealed, is allowed to cool in a desiccator for 30 minutes. The total weight (K) of the weighing bottle containing the absolute dry sample is measured. The weighing bottle, with its mouth opened, is allowed to stand in a constant temperature, constant humidity bath ("Rainbow" from Tabai Seisakusho) at 20° C. and 65% RH for 24 hours. The weighing bottle, with its mount tightly sealed, is allowed to stand in a desiccator for 30 minutes. The weight (H) of the weighing bottle containing the sample is measured. The weighing bottle, with its mouth opened, is allowed to stand in a constant temperature, constant humidity bath at 30° C. and 90% RH for 24 hours. The total weight (S) of the weighing bottle and the sample is measured. The desired values are calculated from the equations below.
Maximum moisture absorptivity=[(S−K)/(K−F)]×100 (%)
Standard absorptivity after moisture release $$=[(H-K)/(K-F)]\times 100\ (\%)$$

Drying rate of fiber or fabric

A sample of fiber as such (or in the form of tubular knitting fabric) or a sample of fabric is dried, cooled, and weighed in the same manner as above. To the sample is added dropwise 1 cc of distilled water, and the total weight ($W_0$) of the weighing bottle and the sample is measured. The weighing bottle, with its mouth opened, is allowed to stand in a constant temperature, constant humidity bath at 20° C. and 65% RH for 10 minutes, and the total weight ($W_T$: T=minutes) of the weighing bottle and the sample is measured. This procedure is repeated for 90 minutes. The moisture content corresponding to the drying time (T) is obtained from the equation below. Moisture content at T=[($W_T$−K)/($W_0$−K)]×100 (%)
where K is defined as above in the measurement of moisture absorptivity.

The values of $W_T$ is plotted against the time T to give a drying curve. The drying rate (cc/min) is obtained from the slope of the tangent line at T=0. The amount of moisture (cc) at the moisture content of 100% is equal to the amount of distilled water added to the sample.
Water absorption height of fabric Five specimens each (1 cm wide and 20 cm long) are cut from a sample fabric in the warp and weft directions. One end of the specimen is fixed by a clamp and the other end is immersed in distilled water at 20±2° C. (about 2 cm deep). Ten minutes after immersion in water, the height (in mm) to which water has risen by capillary action is read out to ½mm. The results are expressed in terms of means of five measurements in the warp and weft directions.
Wash fastness Evaluated in terms of discoloration measured by the gray scale according to JIS L-0844, Test Method A-2, for wash fastness.
Softness of stockings A sample of stockings put on a leg form undergoes subjective test for hand and softness by five panelists. The results are expressed by rating as "good", "fair", "poor", or "bad".
Stuffy or sticky feel of stockings and other garments Subjective test by five panelists wearing samples for 8 hours per day. The results are expressed in the same manner as above.
Clothing comfort of stockings Overall rating of stuffy and sticky feel. The results are expressed in the same manner as above.

Appearance of stockings

Samples of stockings put on white leg forms undergo subjective test for clearness and beauty by five panelists. The results are expressed in the same manner as above.

EXAMPLE 1

Nylon 6 (specified below) was incorporated with PVP (specified below) by using a twin-screw extruder (40 mm in diameter, dual threads). The extrudate in the form of strand was cooled and pelletized. Thus there was obtained a master batch containing 30 wt % PVP. During extrusion, nitrogen was supplied to the hopper and cylinder so that the oxygen content there was kept below 8%.

Nylon 6: having a relative viscosity [$\eta_r$] of 2.72 (in 98% sulfuric acid) PVP: "Rubiscole" K30, special grade (from BASF), having a K-value of 30, prepared in the usual way in isopropyl alcohol as a solvent. This PVP contains 0.02 wt % pyrrolidone. (This PVP is referred to as 30PS hereinafter.)

The above-mentioned master batch (pellets) was mixed with nylon 6 (pellets) in a prescribed ratio by using a rotary vacuum drier. Mixing was accompanied by drying. The mixing ratio was such that the resulting mixed pellets contain PVP in an amount of 3, 7, or 15 wt %.

The mixed pellets were melted at 270° C. and the melt was extruded from a spinneret having 13 holes with a Y-shaped cross section. The emergent filaments were pulled at a rate of 1300 m/min, drawn 2.3 times, and wound up at a rate of 3000 m/min. Thus there were obtained samples of PVP-containing multifilament yarns, each consisting of 13 filaments, 30 denier. Each filament has a trilobal cross section, with the degree of deformation being 2.6. (Run Nos. 3, 4, and 5) The resulting filament yarn was found to contain leachable water-soluble components in an amount as small as 0.7–2.9 wt %.

The results are shown in Table 1. It is apparent from Table 1 that all the samples have a very low yellowness index and contained only a small amount of leachable water-soluble components. In addition, all the samples had a high maximum moisture absorptivity and a great difference between the maximum moisture absorptivity and the standard moisture absorptivity. Moreover, they were also superior in color tone, hand, moisture absorption properties, and drying rate.

The samples were dyed in turquoise blue in the usual way. The dyed yarn with good color development was found to have a lightness of 35 and a saturation of 40.

COMPARATIVE EXAMPLE 1

The same procedure as in Example 1 was repeated to prepare samples of PVP-containing polyamide pellets except that the mixing ratio of the master batch was changed so that the samples contained PVP in an amount of 0.5, 2, or 18 wt %. The resulting pellets were spun into multifilament yarns in the same manner as in Example 1. (Run Nos. 1, 2, and 6) The yarns were knitted into tubular fabrics, which were evaluated in the same manner as in Example 1. The results are shown in Table 1.

It is noted from Table 1 that the samples (in Run Nos. 1 and 2) containing PVP in an amount of 0.5 or 2 wt % were poor in moisture absorbing properties (with the maximum moisture absorptivity being very low and with the difference between the maximum moisture absorptivity and the standard moisture absorptivity being very low). The sample (in Run No. 6) containing PVP in an amount of 18 wt % had a low drying rate and is poor in hand (with sticky touch).

COMPARATIVE EXAMPLE 2

The same procedure as in Example 1 (Run Nos. 3 and 4) was repeated except that the PVP was replaced by "Rubiscole" K30, standard grade (from BASF) containing pyrrolidone in an amount of 0.15 wt % and having a K-value of 30. This PVP was prepared in water as a solvent. This PVP is referred to as K30 hereinafter. Thus there were obtained samples of polyamide multifilament yarns containing PVP in an amount of 3 wt % or 7 wt %. (Run Nos. 7 and 8)

The resulting multifilament yarns (without dyeing) were measured for yellowness index (YI). The yellowness index was as high as 15.0 or 21.2, as shown in Table 1.

The multifilament yarn in Run No. 7 was dyed in the same manner as in Example 1. The dyed sample took on a dull color tone, with the lightness being 32 and the saturation being 28.

except that the mixing ratio of the master batch was changed so that the samples contain PVP in an amount of 5 wt %. Thus there were obtained samples of polyamide multifilament yarns containing PVP in an amount of 5 wt %. (Run Nos. 9, 10, and 11)

The resulting multifilament yarns were satisfactory in color tone and moisture absorbing properties. The filament yarn in Run No. 10 involved no problem with spinning and productivity.

However, Run Nos. 9 and 11 were not satisfactory in productivity as follows. The strand of the master batch containing K17 had PVP partly leached out during passage through cooling water. As the result, the filament yarn incorporated with K17 was poor in moisture absorptivity. On the other hand, the master batch containing K90 had such a high melt viscosity that it was poor in extrudability and yields.

TABLE 1

|  |  |  |  | Physical properties of fiber | | | | | |
| --- | --- | --- | --- | --- | --- | --- | --- | --- | --- |
| Run No. | K-value of PVP | Content of PVP (wt %) | Content of pyrrolidone in PVP (wt %) | Leachable water-soluble components (%) | Yellowness index of un-dyed sample (YI) | Maximum moisture absorp-tivity A (%) | Standard moisture absorp-tivity B (%) | Differ-ence A − B (%) | Drying rate (cc/min) |
| 1* | 30 | 0.5 | 0.02 | 0 | 4.8 | 6.8 | 3.9 | 2.9 | 0.019 |
| 2* | 30 | 2 | 0.02 | 0.5 | 5.1 | 7.2 | 4.0 | 3.2 | 0.019 |
| 3 | 30 | 3 | 0.02 | 0.7 | 6.2 | 8.0 | 4.0 | 4.0 | 0.018 |
| 4 | 30 | 7 | 0.02 | 1.4 | 8.3 | 10.9 | 6.4 | 4.5 | 0.017 |
| 5 | 30 | 15 | 0.02 | 2.9 | 9.5 | 16.3 | 9.2 | 7.1 | 0.015 |
| 6* | 30 | 18 | 0.02 | 3.4 | 11.5 | 18.7 | 10.4 | 8.3 | 0.013 |
| 7* | 30 | 3 | 0.15 | 0.7 | 15.0 | 8.0 | 4.0 | 4.0 | 0.018 |
| 8* | 30 | 7 | 0.15 | 1.4 | 21.2 | 10.8 | 6.5 | 4.3 | 0.015 |

*Comparative Examples

EXAMPLE 2

The same procedure as in Example 1 was repeated except that the PVP was replaced by "Rubiscole" K17, K60, or K90 (from BASF) containing pyrrolidone in an amount of 0.02 wt % and having a K-value of 17, 60, or 90, respectively. This PVP was prepared in isopropyl alcohol as a solvent. This PVP is referred to as K17, K60, or K90, hereinafter. Also, the same procedure as in Example 1 was repeated to prepare samples of PVP-containing polyamide pellets

TABLE 2

|  |  |  |  | Physical properties of fiber | | | | |
| --- | --- | --- | --- | --- | --- | --- | --- | --- |
| Run No. | K-value of PVP | Content of PVP (%) | Content of pyrrolidone in PVP (%) | Yellowness index of un-dyed sample (YI) | Maximum moisture absorp-tivity A (%) | Standard moisture absorp-tivity B (%) | Differ-ence A − B (%) | Productivity of fiber |
| 9 | 17 | 5 | 0.02 | 5.1 | 8.0 | 4.0 | 4.0 | little poor *1 |
| 10 | 60 | 5 | 0.02 | 6.5 | 9.5 | 5.2 | 4.3 | good |
| 11 | 90 | 5 | 0.02 | 7.2 | 9.4 | 5.1 | 4.3 | poor *2 |

*1 Little poor productivity due to leaching of PVP from polymer during production.
*2 Poor productivity due to high melt viscosity at the time of incorporation of PVP into polymer.

EXAMPLE 3

The same procedure as in Example 1 was repeated to produce samples of multifilament yarns of PVP-containing nylon 6 (10 denier, 5 filaments, 45% drawing, with a round cross section), except that the nylon 6 was replaced by the one which has a relative viscosity [η$_r$] of 2.8 (in 98% sulfuric acid), containing no titanium oxide, and the spinneret was replaced by the one which has holes with a round cross section. (Run Nos. 14, 15, and 16)

The nylon 6 filament yarn (with the number of twist being 12 t/m) was used as the covering yarn on a 20-denier "Spandex" core (polyester-based polyurethane elastic yarn). There was obtained a single-covered elastic yarn twisted in the S direction or Z direction, with the number of twists being 2000 t/m and the draft of core yarn being 3.0 times.

The single-covered elastic yarns (twisted in S direction and Z direction) were supplied alternately to the feeder of a knitting machine (with 400 needles) to form the leg part of panty hose, with the remainder knitted in the usual way. The panty hose was dyed, finished, and set on leg forms.

The leg part of the panty hose was evaluated. The results are shown in Table 3.

sively small amount had a stuffy feeling despite slightly improved moisture absorptivity difference (A–B). Conversely, the panty hose (in Run No. 17) made from yarns containing PVP in an excess amount had a sticky feel and were poor in clothing comfort. In addition, they had a yellowness index higher than (before dyeing) and took on a dull color tone lacking arness.

The yarns (in Run Nos. 18 and 19) containing pyrrolidone in an excess amount had a yellowness index higher than 10 before dyeing and gave panty hose taking on a dull color tone lacking clearness The panty hose (Run No. 20) made from yarns containing no PVP had a stuffy feel and were poor in clothing comfort.

TABLE 3

| | Nylon 6 long filaments | | | | Properties of leg part of panty hose | | | | | | |
| --- | --- | --- | --- | --- | --- | --- | --- | --- | --- | --- | --- |
| Run No. | Content of PVP (wt %) | Content of pyrrolidone in PVP (wt %) | Leachable water-soluble components (%) | Yellowness index before dyeing (YI) | Maximum moisture absorptivity A (%) | Standard moisture absorptivity B (%) | Difference A − B (%) | Stuffy feel | Sticky feel | Clothing comfort | Clearness |
| 12* | 0.5 | 0.02 | 0.0 | 4.8 | 6.8 | 3.9 | 2.9 | bad | fair | bad | fair |
| 13* | 2 | 0.02 | 0.5 | 5.1 | 7.2 | 4.0 | 3.2 | poor | fair | poor | fair |
| 14 | 3 | 0.02 | 0.7 | 6.2 | 8.0 | 4.0 | 4.0 | fair | fair | fair | fair |
| 15 | 7 | 0.02 | 1.4 | 8.3 | 10.9 | 6.4 | 4.5 | good | fair | good | fair |
| 16 | 15 | 0.02 | 2.9 | 9.5 | 16.3 | 9.2 | 7.1 | good | fair–poor | fair | fair |
| 17* | 18 | 0.02 | 3.4 | 1.5 | 18.7 | 10.4 | 8.3 | good | bad | bad | poor |
| 14 | 3 | 0.02 | 0.7 | 6.2 | 8.0 | 4.0 | 4.0 | fair | fair | fair | fair |
| 18* | 3 | 0.15 | 0.7 | 15.0 | 8.0 | 4.0 | 4.0 | fair | fair | fair | bad |
| 15 | 7 | 0.02 | 1.4 | 8.3 | 10.9 | 6.4 | 4.5 | fair | fair | fair | fair |
| 19* | 7 | 0.15 | 1.4 | 21.1 | 10.8 | 6.5 | 4.3 | fair | fair | fair | bad |
| 20* | 0 | 0 | 0 | 0 | 3.6 | 2.5 | 2.0 | bad | fair | bad | fair |

*Comparative Examples

It is noted from Table 3 that the panty hose in this example had good clothing comfort as indicated by the large difference (A–B) between the maximum moisture absorptivity and the standard moisture absorptivity.

COMPARATIVE EXAMPLE 3

The same procedure as in Example 3 was repeated to produce PVP-containing polyamide pellets and to produce nylon 6 filament yarns from them, except that the content of PVP was changed to 0.5, 2, or 18 wt %. (Run Nos. 12, 13, and 17) The same procedure as in Example 3 (Run Nos. 14 and 15) was also repeated to produce nylon 6 filament yarns containing PVP in an amount of 3 wt % or 7 wt %, except that the PVP was replaced by the same one as used in Comparative Example 2 (containing 0.15 wt % pyrrolidone and having a K-value of 30). (Run Nos. 18 and 19)

The same procedure as in Example 3 was repeated to produce nylon 6 filament yarns, except that the nylon 6 pellets were not incorporated with PVP. (Run No. 20)

Using the nylon 6 filament yarn (with the number of twist being 12 t/m) as the covering yarn, a single-covered elastic yarn was prepared in the same manner as in Example 3. This yarn was made into panty hose. The leg part of the panty hose was evaluated. The results are shown in Table 3.

It is noted from Table 3 that the panty hose (in Run Nos. 12 and 13) made from yarns containing PVP in an exces-

EXAMPLE 4

The same procedure as in Example 3 (Run No. 15) was repeated to give nylon 6 filament yarns (10 denier, 5 filaments), except that the spinning rate and draw ratio were changed to 1000 m/min and 3.1 times, or 1800 m/min and 1.7 times, for adequate elongation and Young's modulus. (Run Nos. 22 and 23)

A covered elastic yarn was prepared using the nylon 6 filament yarn as the covering, and samples of panty hose were prepared in the same manner as in Example 3. The leg part of panty hose was evaluated. The results are shown in Table 4.

It is noted from Table 4 that the samples had a good soft feel, good appearance, and good wash fastness when the value of [A/(B×C)] was in the range of 0.25 to 0.40. By contrast, the samples lacked a soft feel if the value of [A/(B×C)] was smaller than 0.25 (as in Run Nos. 20 and 22), and they were poor in appearance when the value of [A/(B×C)] was greater than 0.40 (as in Run Nos. 17 and 23).

TABLE 4

| Run No. | Filament yarn | | | | | Properties of leg part | | |
|---|---|---|---|---|---|---|---|---|
| | Content of PVP (wt %) | Elongation (%) [A] | Young's modulus (g/d) [B] | No. of filaments [C] | Value of A/(B × C) | Soft feel | Appearance | Wash fastness |
| 14 | 3 | 45 | 32 | 5 | 0.28 | fair | fair | fair |
| 22# | 7 | 30 | 38 | 5 | 0.16 | poor | fair | fair |
| 15 | 7 | 45 | 30 | 5 | 0.30 | fair | fair | fair |
| 23# | 7 | 60 | 18 | 5 | 0.67 | fair | bad | bad |
| 16 | 15 | 45 | 24 | 5 | 0.38 | fair | fair | fair |
| 17*# | 18 | 45 | 18 | 5 | 0.50 | fair | bad | fair |
| 20*# | 0 | 45 | 40 | 5 | 0.23 | poor | fair | fair |

*Comparative Examples
*#Comparative Examples conforming to Claim 13

EXAMPLE 5 AND COMPARATIVE EXAMPLE 4

Samples of PVP-containing nylon 6 POY filament yarns (30 denier, 10 filaments) were obtained (in Run Nos. 24 to 26) from the same blend pellets (containing PVP in an amount of 3%, 75, or 18%) as used in Example 3 (Run Nos. 14, 15, and 17) by melt spinning at 270° C. from a spinneret having round holes, with the spinning rate being 3000 m/min.

The nylon 6 POY filament yarn underwent false twisting (in S or Z direction) at 170° C. and at a rate of 500 m/min.

The false twisted nylon 6 filament yarn was used as the covering yarn on a 30-denier core (polyester-based polyurethane elastic yarn). There was obtained a single-covered elastic yarn twisted in the S direction or Z direction, with the number of twists being 1700 t/m and the draft of core yarn being 3.2 times.

The S-single-covered elastic yarn, S-false-twisted nylon 6 yarn, Z-single-covered elastic yarn, and Z-false-twisted nylon 6 yarn were supplied sequentially (in the order mentioned) to the feeder of a knitting machine (with 400 needles) to form the panty part of panty hose, with the leg part knitted from the filament yarn in Example 3 (Run No. 15). The resulting panty hose were dyed, finished, and set on leg forms in the usual way.

For the purpose of comparison, the same procedure as mentioned above was repeated, except that nylon 6 pellets containing no PVP were used. (Run No. 27)

The panty part of the panty hose was evaluated. The results are shown in Table 5.

It is noted from Table 5 that the panty hose in this example (Run Nos. 24 and 25) had good clothing comfort as indicated by the large difference (A–B) between the maximum moisture absorptivity and the standard moisture absorptivity.

By contrast, the comparative sample (Run No. 26) containing PVP in an excess amount was poor in clothing comfort due to a sticking feel, and the comparative sample (Run No. 27) containing no PVP was also poor in clothing comfort due to a stuffy feel.

TABLE 5

| | | Properties of panty part of panty hose | | | | | |
|---|---|---|---|---|---|---|---|
| Run No. | Content of PVP (wt %) | Maximum moisture absorptivity A (%) | Standard moisture absorptivity B (%) | Difference A − B (%) | Stuffy feel | Sticky feel | Clothing comfort |
| 24 | 3 | 9.5 | 5.5 | 4.0 | fair | fair | fair |
| 25 | 7 | 12.0 | 7.5 | 4.5 | good | fair | good |
| 26* | 18 | 19.4 | 11.1 | 8.3 | good | bad | bad |
| 27* | 0 | 5.5 | 3.5 | 2.0 | bad | poor–bad | bad |

*Comparative Examples

EXAMPLE 6

A half-tricot knitting fabric (32 gauge) was made (in Run Nos. 30 to 32) from PVP-containing polyamide multifilament yarn obtained in Example 1 (Run Nos. 3 to 5).

The half-tricot knitting fabric was measured for yellowness index and water absorption height. The results are shown in Table 6. A slip was sewn from this fabric in the usual way and the slip underwent wearing test. The results are shown in Table 6.

It is noted from Table 6 that all the samples had a low yellowness index, a large difference between the maximum moisture absorptivity and standard moisture absorptivity, and a high water absorption height. Also they offered good clothing comfort, without sticky feel or stuffy feel.

COMPARATIVE EXAMPLE 5

In Run Nos. 28, 29, and 33–35, samples of half-tricot knitting fabrics were prepared in the same manner as in Example 6 from PVP-containing polyamide multifilament yarn obtained in Comparative Example 1 (Run Nos. 1, 2, and 6) or PVP-containing polyamide multifilament yarn obtained in Comparative Example 2 (Run Nos. 7 and 8).

As shown in Table 6, the samples (in Run Nos. 28 and 29) made from yarns containing only a small amount of PVP suffered a stuffy feel due to the small difference between the two values of moisture absorptivity. By contrast, the samples (in Run No. 33) made from yarns containing an excess amount of PVP were poor in clothing comfort due to a sticky feel.

Samples of slips made from yarns containing an excess amount of pyrrolidone (in Run Nos. 34 and 35) had such a high yellowness index (YI) that they looked dark and dull; and they were of little commercial value.

TABLE 6

| Run No. | K-value of PVP | Content of PVP (wt %) | Content of pyrrolidone in PVP (wt %) | Fiber properties Difference A − B (%) | Properties of knitting fabric | | Properties of slip | |
|---|---|---|---|---|---|---|---|---|
| | | | | | YI before dyeing | Water absorption height (mm) | Stuffy feel | Sticky feel |
| 28* | 30 | 0.5 | 0.02 | 2.9 | 5.0 | 72 | bad | good |
| 29* | 30 | 2 | 0.02 | 3.2 | 5.3 | 73 | poor | good |
| 30 | 30 | 3 | 0.02 | 4.0 | 6.5 | 75 | good | good |
| 31 | 30 | 7 | 0.02 | 4.5 | 8.7 | 75 | good | good |
| 32 | 30 | 15 | 0.02 | 7.1 | 9.9 | 76 | good | fair |
| 33* | 30 | 18 | 0.02 | 8.3 | 12.1 | 76 | good | bad |
| 34* | 30 | 3 | 0.15 | 4.0 | 16.1 | 75 | good | good |
| 35* | 30 | 7 | 0.15 | 4.3 | 22.3 | 75 | good | good |

*Comparative Examples

EXAMPLE 7

Several kinds of nylon 6 multifilament yarns (30 denier, 13 filaments) containing PVP in an amount of 5 wt % and having cross sections shaped as circle, Y-shape, pentagon, or octagon, with the degree of deformation shown in Table 7, were prepared in the same manner as in Example 1 (Run No. 4), except that the spinneret was changed according to the respective cross sections. (Run Nos. 36 to 43)

The filament yarns were made into half-tricot knitting fabrics in the same manner as in Example 6. The resulting samples were measured for yellowness index and water absorption height. The results are shown in Table 7.

It is noted from Table 7 that the samples made from yarns having a degree of deformation higher than 2.4 (as in Run Nos. 39, 41, and 43) felt less sticky due to high moisture absorptivity.

tained therein. The polyamide fiber has a very low yellowness index and a good color tone and can be dyed without becoming dull. Therefore, the polyamide fiber can be made into garment fabrics superior in moisture absorptivity, color tone, and clothing comfort. These fabrics are suitable for inner wear, stockings, and sports wear which need both good moisture absorptivity and good appearance. The stockings and inner wear according to the present invention offer improved hand and clothing comfort (freedom from stuffy feel and sticky feel), especially in summer or during sports, while keeping their function and appearance as good as the conventional ones.

What is claimed is:

1. A hygroscopic polyamide fiber which is formed from a polyamide containing polyvinylpyrrolidone in an amount of 3–15 wt % of the polyamide, with the content of pyrrolidone in the fiber being less than 0.1 wt % of the content of the polyvinylpyrrolidone in the fiber.

2. A hygroscopic polyamide fiber as defined in claim 1, wherein the polyvinylpyrrolidone has a K-value of 20 to 70.

3. A hygroscopic polyamide fiber as defined in claim 1, which has a yellowness index lower than 10 before dyeing.

TABLE 7

| Run No. | Content of PVP (wt %) | Content of pyrrolidone in PVP (wt %) | Cross section of fiber | | Properties of fiber | Properties of knitting fabric | | |
|---|---|---|---|---|---|---|---|---|
| | | | Shape | Degree of deformation | Difference A − B (%) | YI before dyeing | Water absorption height (mm) | Sticky feel |
| 36# | 5 | 0.02 | round | 1.0 | 4.2 | 7.0 | 38 | bad |
| 37# | 5 | 0.02 | Y-shaped | 1.7 | 4.2 | 6.8 | 55 | bad |
| 38# | 5 | 0.02 | Y-shaped | 2.3 | 4.3 | 6.7 | 63 | poor |
| 39 | 5 | 0.02 | Y-shaped | 2.5 | 4.3 | 6.9 | 70 | good |
| 40# | 5 | 0.02 | pentagon | 2.2 | 4.2 | 6.5 | 65 | poor |
| 41 | 5 | 0.02 | pentagon | 2.5 | 4.3 | 6.4 | 72 | good |
| 42# | 5 | 0.02 | octagon | 2.3 | 4.2 | 6.4 | 68 | poor |
| 43 | 5 | 0.02 | octagon | 2.5 | 4.2 | 6.4 | 75 | good |

Comparative Examples conforming to Claim 7.

Example (for comparison of claim 8)

The same procedure as in Example 1 was repeated to produce polyamide filaments containing PVP in an amount of 10 wt %, except that the pellets for melt spinning were formed by blending nylon 6 pellets with PVP powder (10 wt %), followed by drying. The resulting filaments were found to have a rough surface due to a high content (5.8%) of water-soluble components which were leached out.

[Effect of the invention]

The present invention Drovides a polyamide fiber which is highly hygroscopic owing to polyvinylpyrrolidone con- 4. A hygroscopic polyamide fiber as defined in claim 1, which contains leachable water-soluble components in an amount less than 5%.

5. A hygroscopic polyamide fiber as defined in claim 1, wherein the polyvinylpyrrolidone is one which is synthesized in isopropyl alcohol as a solvent.

6. A hygroscopic polyamide fiber as defined in claim 1, which has a non-circular cross section.

7. A hygroscopic polyamide fiber as defined in claim 6, wherein the odd-shaped cross section is trilobal or multilobal and has a degree of deformation greater than 2.4.

8. A hygroscopic polyamide fiber as defined in claim 1, which has a maximum moisture absorptivity higher than 8%, with the difference between the maximum moisture absorptivity and the standard moisture absorptivity being greater than 4%.

9. A hygroscopic polyamide fiber as defined in claim 1, which has a drying rate greater than 0.014 cc/min.

* * * * *

UNITED STATES PATENT AND TRADEMARK OFFICE
CERTIFICATE OF CORRECTION

PATENT NO.    : 5,922,830
DATED         : July 13, 1999
INVENTOR(S)   : Kinoshita et al.

It is certified that error appears in the above-identified patent and that said Letters Patent is hereby corrected as shown below:

In Column 12, at line 6, after "than", please insert --10--.

In Column 15, at line 66, please change "Drovides" to --provides--.

Signed and Sealed this

Twenty-ninth Day of August, 2000

Attest:

Q. TODD DICKINSON

Attesting Officer

Director of Patents and Trademarks